United States Patent [19]

Knapp

[11] Patent Number: 5,138,634
[45] Date of Patent: Aug. 11, 1992

[54] ALTERED-LENGTH MESSAGES IN INTERRUPTED-CLOCK TRANSMISSION SYSTEMS

[76] Inventor: Stephen L. Knapp, P.O. Box 14429, Reno, Nev. 89507

[21] Appl. No.: 485,374

[22] Filed: Feb. 26, 1990

[51] Int. Cl.$^5$ .............................................. H04C 7/00
[52] U.S. Cl. ................................. 375/106; 340/825.67; 370/101
[58] Field of Search .............. 375/119, 120, 106, 107, 375/36, 117; 370/101, 15, 110.1; 340/825.65, 825.66, 825.67; 331/1 A, 1 R; 328/155, 120, 13

[56] References Cited

U.S. PATENT DOCUMENTS

| | | | |
|---|---|---|---|
| 3,360,777 | 12/1967 | Kolm | 340/825.66 |
| 3,959,606 | 5/1976 | Merlet et al. | 340/825.07 |
| 4,161,635 | 7/1979 | Wolaver | 340/825.07 |
| 4,199,663 | 4/1980 | Herzog | 370/101 X |
| 4,271,510 | 6/1981 | Looschen | 375/36 X |
| 4,470,127 | 9/1984 | Thompson | 364/900 |
| 4,558,428 | 10/1985 | Matsumura et al. | 364/900 |
| 4,756,025 | 7/1988 | Munz et al. | 455/608 |
| 4,768,202 | 8/1988 | Lacroix et al. | 375/3.1 |
| 4,841,549 | 6/1989 | Knapp | 375/111 |
| 4,872,186 | 10/1989 | Gerhart et al. | 370/101 X |
| 4,910,755 | 3/1990 | Knapp | 375/120 |
| 4,964,141 | 10/1990 | Matsushima et al. | 375/36 X |

Primary Examiner—Benedict V. Safourek
Assistant Examiner—Tesfaldet Bocure

[57] ABSTRACT

Data words of non-standard length are used to communicate optional messages with non-standard meaning in an interrupted-clock, bit-serial data transmission system which employs a timing channel and one or more separate data channels. In an interrupted-clock digital data transmission system, interruptions of clock pulses in a timing channel are used to identify individual data word groups in the simultaneous messages on one or more data channels. According to the present invention, message words constituting groups of data bits more or less in number than some standard value are used to communicate optional messages with non-standard content or meaning. Such altered-length message words may be used, for example, to monitor the operation of the transmission system itself and to control its operation. They make efficient use of the available system bandwidth. A clock regenerator circuit is described which is an improvement over the prior art for altered-length messages.

17 Claims, 6 Drawing Sheets

ALTERED-LENGTH MESSAGES IN
INTERRUPTED-CLOCK TRANSMISSION
SYSTEMS

BACKGROUND: FIELD OF THE INVENTION

This invention relates generally to improved communication systems and methods involving high performance serial data transmission systems, and, in particular, to methods of modifying the characteristics of the message in order to communicate non-standard messages. A standard message is defined in this application as belonging to the most significant category of message traffic carried by the communication system, at least in terms of content. Usually standard messages form the category of message carried most frequently by the system. Normally, such standard messages possess a fixed and predetermined message format. Most often, standard messages have a format defined in terms of length, ultimately measured in the number of bits, but other physical characteristics, such as bit rate, special data patterns as pre- or post-fixes, or dedicated transmission channels, may be used to distinguish standard from non-standard messages.

Examples of common terms for physical message entities are "bytes", "words", "blocks", and "frames". Whether such a term refers to standard or non-standard messages depends in general on some distinguishing physical characteristic, and the interpretation of the message may be entirely different in the two classes. Non-standard messages might be used, for example, for monitoring and controlling the operation of the transmission system or for communicating unusual types of data messages.

In recent years there has arisen a demand for high performance digital data transmission techniques, especially in the fields of information processing, scientific instrumentation, and remote operation of instruments or machines. By "high performance" is meant communication at sufficiently high data rates and over distances sufficiently great that the physical properties of the transmission lines become determining factors in the maximum data transfer speed permissible with insignificant error rate.

Primarily for economic reasons, it is usually important to keep high performance transmission systems as "busy" as possible. In other words the system bandwidth should be fully occupied. Since such systems are typically employed for long distance communications, it is costly to provide additional message channels for monitoring system performance, for system control, or for other non-standard communications. Thus it is common to use the same physical channel media (i.e., transmission lines) for the latter purposes. It is frequently of considerable value to minimize the loss of overall system bandwidth for such non-standard (but often essential) purposes.

The invention disclosed in this application is a novel method for providing for transmission of non-standard messages over the normal message channels. The method is simple, inexpensive, efficient in terms of system bandwidth, and particularly well adapted to data transmission systems using an interrupted clock protocol. Also disclosed in this application is an improved apparatus for regenerating the interrupted-clock timing messages when the novel method of non-standard messages is used.

BACKGROUND: CROSS-REFERENCE TO RELATED APPLICATION

The following patent applications are related to this application:
Title: Simple, High Performance Digital Data Transmission System and Method
Inventor: Stephen L. Knapp
U.S. Pat. No.: 4,841,549
Issued: Jun. 20, 1989
Title: Regenerator/Synchronizer Method and Apparatus For Missing-Clock Timing Messages
Inventor: Stephen L. Knapp
U.S. Pat. No.: 4,910,755
Issued: Mar. 20, 1990

BACKGROUND: TERMINOLOGY AND SUMMARY OF THE INTERRUPTED-CLOCK TECHNIQUE

The following terms are used in this document. In a one directional transmission system, the messages begin at a "transmitting station", "sending station", or "originating station" and ultimately arrive at a "receiving station" or "destination station". Repeating stations may be used between the originating and destination stations. In a bi-directional system, the nearby station is regarded as the "master station", and the distant station is regarded as the "remote station". The remote station is normally under the control of the master station, especially in cases of remote operation of machines. Bi-directional repeating stations may be used between the master and the remote stations. By "channel" is meant any transmission path for a single (that is, non-multiplexed) stream of serial binary information. Examples of such paths are coaxial cable, twisted pair cable, fiber optic cable employing unpolarized light, microwave link of one polarization, etc. Several channels may be multiplexed on one path, however, as in the cases of multiple polarizations and/or wavelength bands transmitted on a single fiber optic cable.

When the transmission distance is sufficiently great that the propagation time is comparable to or greater than the time between successive characters or "words", it is desirable for best performance to employ "bit-synchronous" timing of the data transfer, wherein the destination station uses timing messages produced at the originating station to capture bit-wise the data messages. A simple method of high performance data transmission from a transmitting station to a receiving station separated by a distance as great as several kilometers or more has been disclosed in a related invention by applicant Knapp, U.S. Pat. No. 4,841,459, issued Jun. 20, 1989 [herinafter referred to as Ref. (A)]. In the method of Ref. (A) the timing messages are sent over a dedicated timing message channel, and the digital data are sent over one or more data message channels with propagation length nearly identical to that of the timing channel. The data message bits are grouped into "words" and are transmitted sequentially on the data channels along with simultaneous timing clocks on the timing channel. The word groups are separated and synchronized by means of the interruption of the timing clocks.

"Standard" or "normal" data messages consist of words of N bits each in length, where N is some predetermined integer. These normal messages comprise the ordinary communication traffic of the transmission system. However, the data messages of separate capability, used to control or monitor the operation of the transmission system itself, or perhaps to convey information in a category otherwise distinct from the normal traffic, are called "non-standard" in this application. In this application the non-standard messages are distinguished in length (or bit count) by being longer or shorter than those of the standard messages. The non-standard timing messages differ similarly from standard word timing messages, although the intervals over which the timing clocks are interrupted are identical for standard and for non-standard messages.

The duration over which the timing clocks are interrupted may be chosen to best suit the requirements of the specific case. As discussed in Ref. (A), the interruption usually is for an interval of one or perhaps a few timing clock cycles, although intervals may be used which are fractional multiples of the clock cycle.

A technique is disclosed in Ref. (A) for detecting at the destination station the absence of one or more timing clocks and for synchronizing thereby the final capture of the data word groups. That technique, called a "missing pulse detector", is simple and inexpensive, being based upon a retriggerable multivibrator. An alternative interrupted-clock detection technique, based on a clock recovery method, is disclosed in a second related invention by applicant Knapp, U.S. Pat. No. 4,910,755, issued Mar. 20, 1990 [hereinafter referred to as Ref. (B)]. In the method of Ref. (B) an oscillator at each remote station is locked in frequency to the oscillator at the originating (or master) station, which is possible when the interruption interval is related to the transmitting clock period by a ratio of integers.

The interrupted-clock method permits easy adjustment of the transmission system for best performance and maximum bandwidth. According to Refs. (A) and (B), the rate of the timing clocks, and therefore of the data bit rate, may be varied if desired over some range by means of an adjustable oscillator at the transmitting station in order to optimize system performance.

So long as the detection of the clock interruption is unaffected, the interrupted clock method also permits the word length to be varied easily, and it is this characteristic of the interrupted-clock transmission method which forms the basis of the current invention.

BACKGROUND: DISCUSSION OF PRIOR ART

In high performance communications systems it is desirable to provide for a message category or transmission capability separate in some characteristics from that used for normal message traffic. There are several reasons for this. First, having a separate capability provides added flexibility against unknown future requirements. Moreover, a separate capability permits monitoring of the status and operation of the various subsystems (such as repeaters and destination stations) without affecting the normal data messages. Furthermore, a separate capability facilitates the adjustment of the clock rate for best bandwidth performance, as was discussed above, by monitoring the correct progress of designated messages from the master station to a remote destination station, as a function of clock rate. In a bidirectional system, the latter adjustment is best accomplished by retransmission from the remote station back to the master station as a so-called "loop-back" data verification.

Several methods exist in the prior art for providing a non-standard message category; in most cases this category is provided for control and monitoring of the data transmission system. In the method of U.S. Pat. No. 3,959,606 (1976) to Merlet et al., system control and monitoring is accomplished by means of additional "auxiliary" wires (channels), which means are complex, costly, and inefficient. In the method of U.S. Pat. No. 4,161,635 (1979) to Wolaver, a special repeated signal modulation, distinct from the data transmission modulation, is used to evaluate system performance; this method suffers from the disadvantages of requiring an additional modulation detector at each repeating station and of not providing flexible control. The inventions of U.S. Pat. No. 4,470,127 (1984) to Thompson, 4,558,428 (1985) to Matsumura et al., 4,756,025 (1988) to Munz et al., 4,271,510 (1981) to Looshen, and 4,768,202 (1988) to Lacroix, et al. all require complex circuits and predetermined data patterns for system test or control, and also require a fixed data message length, a fixed clock rate or pattern of clock pulses in the timing message, and/or other restrictions in clock or data formats. The aforementioned method of Looshen doubles the clock rate to identify data messages which might be non-standard, while keeping the message word length (measured in bits) fixed. In none of these cases of prior art is the clock rate explictly permitted to be varied over some range; in most cases it must be fixed at a definite value.

In contrast to the above examples of prior art, the inventions of Refs. (A) and (B) do permit the clock rate to be varied over some range. However, these latter cases of the prior art do not consider explicitly the question of non-standard messages. Although Ref. (A) does allow for varying word length, no specific mention is made therein of using word length as a means for identifying non-standard words. Without modification, these examples of the prior art thus imply the inefficient use of system bandwidth by dedicating a portion of the standard message address space (or code space) for non-standard messages.

The ubiquitous RS-232 transmission standard and its descendants are inefficient with regard to non-standard messages. The latter are accommodated frequently by special dedicated words (for instance, the ASCII bytes EOT, ACK, XON, XOFF, etc.), or sometimes by "escape sequences", so-called because they are multiple-byte messages beginning with the byte ESC. This inefficiency is caused primarily because the RS-232 type protocols, with character bytes as words, are inflexible with respect to message word length. The recently announced "TAXI" system from Advance Micro Devices, Inc. (AMD, Sunnyvale, CA), provides for non-standard messages, called "command" messages by AMD, by dedicating a portion of the message codes for that purpose. Another recent high performance system, the "Hot Rod" system, from Gazelle Microcircuits, Inc. (Santa Clara, CA), provides for non-standard messages only by means of dedicated words or bit patterns, similar to the means in the RS-232 protocol. Again, the message word length may not be altered with these commercial systems.

SUMMARY OF THE INVENTION

In an interrupted clock, serial digital transmission system, the length of a data word is determined by the number of bit positions between successive interruptions of the clock pulses. Thus non-standard messages may be distinguished from standard (data) messages, which normally comprise the majority of all messages, by using word lengths different from those of standard messages to identify non-standard messages. The data contained in words so identified may be used to carry the information content associated with the non-standard messages. Standard messages, which normally comprise the majority of all messages, have a certain length, or possibly as suggested in the method of Ref. (A) have some defined set of lengths.

In accordance with the present invention, one or more variations in the length of the transmitted word are used to identify the message as belonging to one or more non-standard categories. In the most usual case in which a standard message word is defined to be of some predetermined length, a control message, as an example of a non-standard message word, contains more or less bits than a standard message word. In one particular embodiment of the present invention, it is an efficient choice only to lengthen the message by the one or more bits used to identify it as a non-standard message.

In a bi-directional transmission system loop-back transmission verifications form one class of system control operations. In such a verification operation, the content of the non-standard control word might alert the destination station to transmit all or part of the received data message bits in the opposite direction back to the originating station as a check on the overall system performance. In the case of a system with repeating stations, a number of the message bits in the control word might be used as an address to identify which particular one of the repeaters should provide the loop-back message. In general, the number and variety of options associated with a non-standard messages is likewise governed by the number of bit positions in (and thus the length of) the message.

The present invention has a number of advantages over the prior art: (1) It is efficient in serial systems, since system bandwidth is used for non-standard messages only when necessary. (2) Additional message channels are not required. (3) It is simple and inexpensive to implement in serial hardware; counters or shift-registers easily provide detection and identification of non-standard messages. (4) Great flexibility of system design and operation is provided by this simple technique. (5) Subsystems are addressable for control operations. (6) Loop-back verification in a bi-directional system with repeating stations may be accomplished progressively, so that sections of the system along the course of transmission may be examined individually. (7) Because the invention is insensitive to system clock frequency, it further facilitates adjusting the transmitter clock frequency for maximum system performance, in those systems using a clock frequency which may be varied.

DESCRIPTION OF PREFERRED EMBODIMENTS

Figure 1:
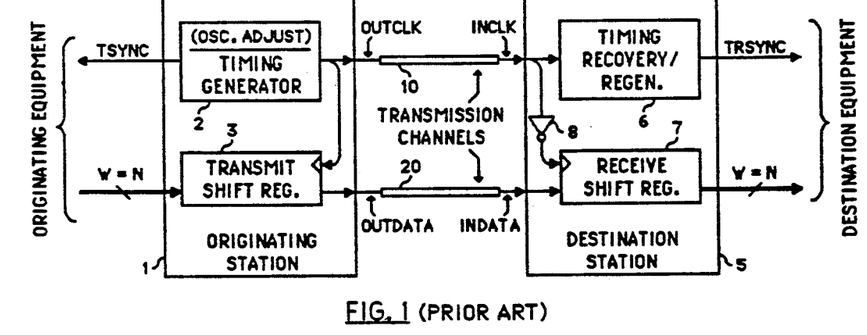
FIG. 1 is an overall block and electrical diagram generally illustrating the interrupted-clock data transmission system of Ref. (A), showing an adjustable timing clock, separate timing and data channels, and a standard word length of N bits.

Reference is directed initially to FIG. 1, which is an overall block and electrical diagram generally illustrating the basic interrupted-clock data transmission system of prior art Ref. (A) [U.S. Pat. No.: 4,841,549], showing an originating station 1, and a destination station 5, connected by at least two transmission channels 10 and 20. The originating station 1 contains timing generator 2 within which is a timing clock oscillator which may be adjusted over some frequency range. Timing generator 2 produces an interrupted clock output signal, OUTCLK, for transmission to the destination station, and a handshake signal, TSYNC, to inform the originating equipment when the originating station is ready to accept a new word for transmission. The originating station 1 also contains a transmit shift register (or equivalent) 3 which accepts from the originating equipment a new word for transmission as N bits in parallel (word length W=N), and which transmits the N bits serially as the signal OUTDATA to the destination station.

The destination station 5 of FIG. 1 contains a timing recovery/regenerator 6 which accepts the transmitted interrupted clock signal, now renamed INCLK, and which contains a simple missing pulse detector. Regenerator 6 produces a synchronizing signal TRSYNC which is used to communicate to the destination equipment the occurrance of the missing pulse and therefore the availability of a new received data word. Destination station 5 of FIG. 1 also contains a receive shift register (or equivalent) 7 which accepts incoming transmitted data messages as the serial signal now named INDATA. Shift register 7 is controlled by the incoming interrupted-clock signal INCLK after invertor 8, and presents the input word as N bits in parallel (word length W=N) to the destination equipment.

Figure 2:
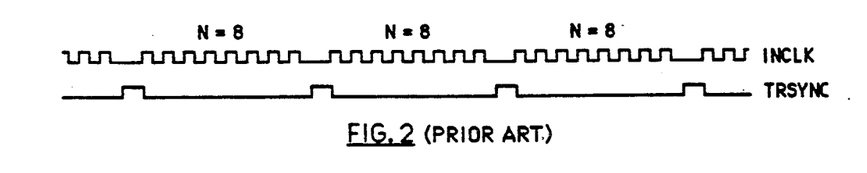
FIG. 2 is a series of graphs illustrating the operation of the apparatus of FIG. 1.

The operation of the destination station 5 may be understood by reference to FIG. 2, which shows the relationship between the signal INCLK (same as OUTCLK) and the output signal TRSYNC.

Figure 3:
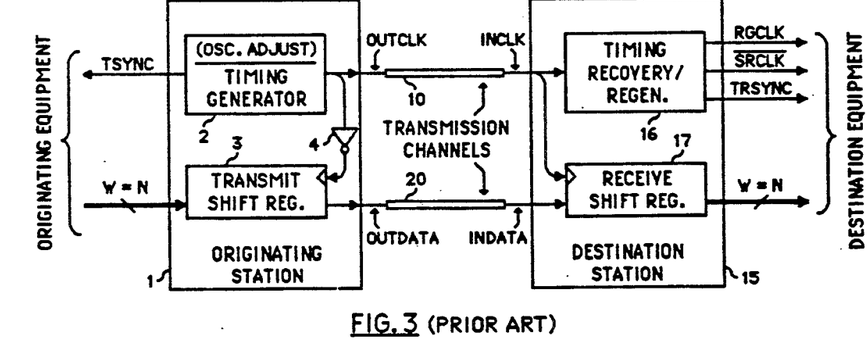
FIG. 3 is an overall block and electrical diagram generally illustrating the interrupted-clock data transmission system of Ref. (A) and the timing regenerator method of Ref. (B), showing an adjustable timing clock, separate timing and data channels, and a standard word length of N bits.

FIG. 3 is an over-all block and electrical diagram generally illustrating the interrupted-clock data transmission system of prior art Ref. (B) [U.S. Pat. No.: 4,910,755], and shows an originating station 11, and a destination station 15, connected by at least two transmission channels 10 and 20. The operation of the originating station 11 in Ref. (B) is identical to that in Ref. (A) [element 1 of FIG. 1], with the exception of the relocation of invertor 4 between timing generator 2 and transmit shift register 3, as shown in FIG. 3. The purpose of invertor 4 is to retain the one half clock period separation of a data bit transmission and its respective clock edge transmission, while facilitating simple means for subsequent retransmission in the destination station if desired.

The destination station 15 in prior art FIG. 3 is similar to the corresponding element, 5, of FIG. 1 and contains timing recovery/regenerator 16 and receive shift register 17. As in FIG. 1, recovery/regenerator 16 has an input signal INCLK and an output signal TRSYNC; however the regenerator 16 of Ref. (B) provides additional output signals $\overline{\text{RGCLK}}$ and $\overline{\text{SRCLK}}$. As described in Ref. (B), $\overline{\text{SRCLK}}$ is the continuous clock signal derived from an oscillator within 16 which is phase-locked to INCLK, and RGCLK is the interrupted-clock signal similarly derived from INCLK; transitions of RGCLK and $\overline{\text{SRCLK}}$ are of opposite phase.

Figure 4:
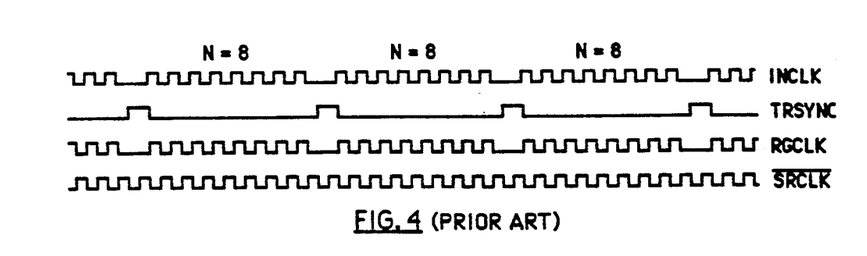
FIG. 4 is a series of graphs illustrating the operation of the apparatus of FIG. 3.

The operation of the destination station 15 may be understood by reference to FIG. 4, which shows the relationship between the signal INCLK and the output signals TRSYNC, RGCLK, and $\overline{\text{SRCLK}}$.

The inventions of Refs. (A) and (B) are designed for a data word length fixed at some number W=N bits, although careful examination of Ref. (A) shows that the system and method therein allows the length of the word to be varied provided the number of bits does not exceed some present number. Examples of this fixed word length W are shown in FIGS. 2 and 4 for the particular value of N=8 bits. The following discussion of embodiments of the present invention will show how to modify the methods of Refs. (A) and (B) to explictly provide means in interrupted-clock transmission systems for employing altered-length data words for nonstandard messages.

Figure 5:
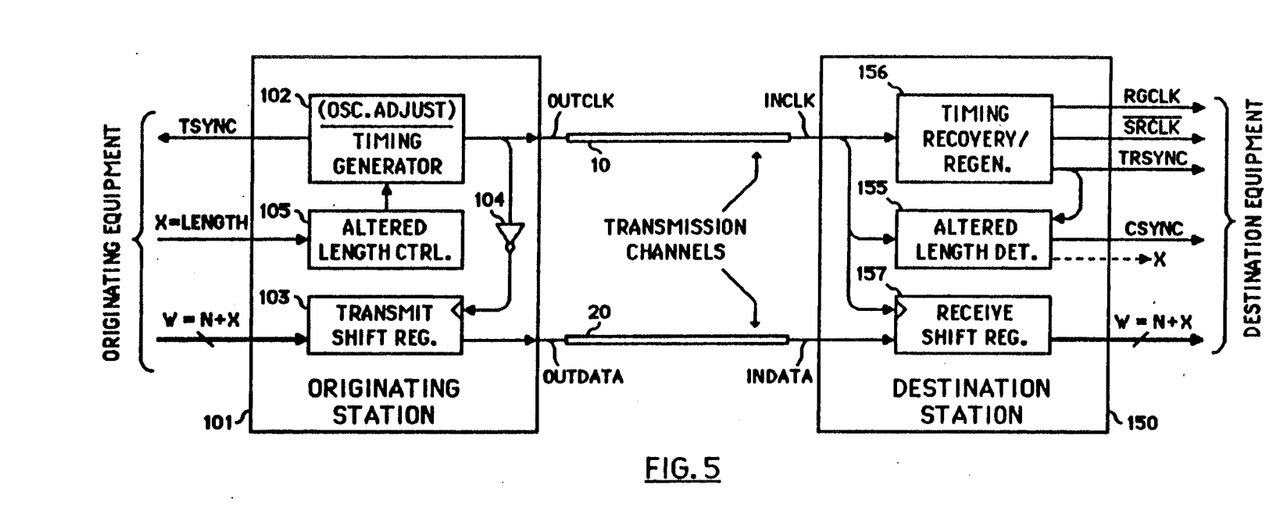
FIG. 5 is an overall block and electrical diagram generally illustrating a data transmission method using data words of altered length for non-standard messages, including an originating station and a destination station, each containing circuit means for altered length words, in accordance with the present invention.

FIG. 5 is an overall block and electrical diagram of the general embodiment of an interrupted-clock data transmission system with means for altered-length messages according to the present invention. FIG. 5 shows an originating station 101, and a destination station 150, connected by at least two transmission channels 10 and 20.

The originating station 101 contains timing generator 102 within which is a timing clock oscillator which may be adjusted over some frequency range. Timing generator 102 is closely similar to generator 2 described above and produces an interrupted clock output signal, OUTCLK, for transmission to the destination station, and a handshake signal, TSYNC, to inform the originating equipment when the originating station is ready to accept a new word for transmission. Originating station 101 also contains a transmit shift register (or equivalent) 103 which accepts from the originating equipment a new data word for transmission as W bits in parallel, and which transmits the W bits serially as the signal OUTDATA to the destination station. Clocks are supplied to the transmit shift register 103 from the timing generator 102 with phase reversal provided by the invertor 104, as discussed above with reference to FIG. 3.

Also contained in the originating station 101 is altered-length control means 105. In order to transmit an altered-length data word, the value of the alteration as a signed integer, X, is communicated from the originating equipment to the altered-length control means 105, so that the total length of the data word to be transmitted as signal OUTDATA is W=N+X bits. At the same time the data word to be transmitted is presented to shift register 103 as W=N+X bits in parallel from the originating equipment. The altered-length control means 105 causes the timing generator 102 to alter the usual series of clocks in signal OUTCLK from N to N+X and to adjust the timing of TSYNC accordingly. The magnitude of integer X must be less than N, but usually X is close to zero.

The destination station 150 is similar to destination stations 5 and 15 described above, with the added provision of means for detecting the arrival of altered-length words. Timing recovery/regenerator 156 normally contains a phase-lock loop subsystem like the one in regenerator 16 above, but it may contain a simple missing pulse detector like that in regenerator 6 above. The leading edge of output signal TRSYNC informs the destination equipment of the arrival of the transmitted word as parallel bits, and output timing signals RGCLK and $\overline{\text{SRCLK}}$ (if provided) may be used for purposes of retransmission. Receive shift register 157 has as input signals the interrupted clock signal INCLK and the transmitted serial data signal INDATA, and provides a parallel output word of W bits. Shift register 157 must contain as many stages as the largest value of W=N+X.

Not contained in destination stations of the prior art is altered-length detector 155 of FIG. 5, which provides an output signal, CSYNC, approximately synchronized with signal TRSYNC, in order to inform the destination equipment of the occurrance of a received data word of altered length. Timing signal TRSYNC is input to detector 155. Two embodiments of altered-length detector 155 are described in this application. One, detects the overflow of a counter or shift register connected to the interrupted clock signal, INCLK, to strobe signal CSYNC when a series of more than W=N uninterrupted clocks are received, and therefore may be used for extended-length words (when X is always non-negative). The other is more general, and uses shift register means to determine not only when a received message word is of altered length (and strobes CSYNC if so), but also the particular value of X, as suggested by the dashed line in FIG. 5.

Figure 6:
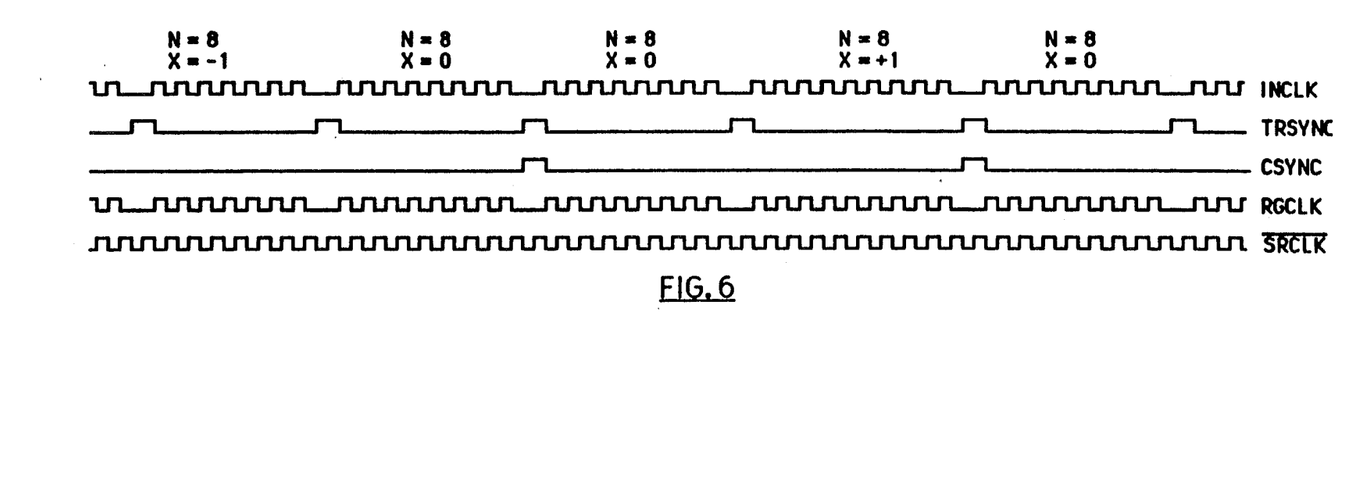
FIG. 6 is a series of graphs illustrating the operation of the apparatus of FIG. 5.

FIG. 6 is a series of graphs illustrating the relative timing of several input and output signals of the apparatus of FIG. 5. A word of standard length contains W=N bits. Altered-length words contain more or less bits by some number, X, so that an altered-length word contains W=N+X bits, where X=−3, −2, −1, 1, 2, 3, etc. FIG. 6, illustrating the operation of the invention for the case N=8, shows three standard length words (X=0) and two altered-length words with X=−1 and X=1.

Figure 7:
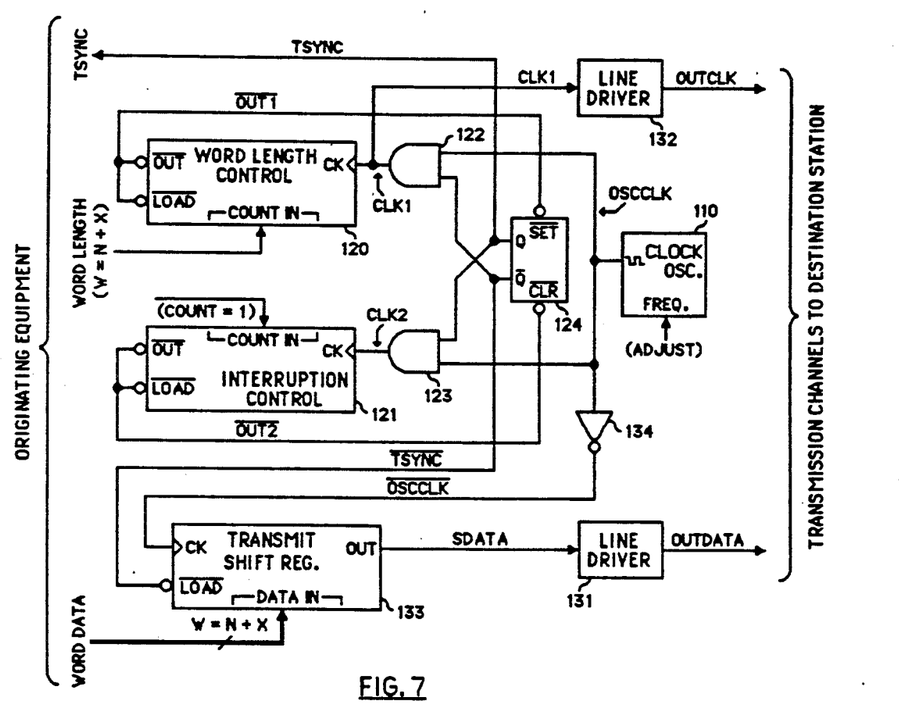
FIG. 7 is an electrical diagram illustrating in greater detail an embodiment of the originating station of FIG. 5.

Attention is now drawn to FIG. 7, which shows an embodiment of the originating station 101 of FIG. 5. FIG. 7 may be more readily understood by reference to FIG. 8, which is a timing diagram for the signals of FIG. 7. Elements 110, 120, 121, 122, 123, and 124 are connected together and form the timing generator 102 and altered-length control 105 of FIG. 5. Element 110 is a clock oscillator the frequency of which may be varied over some range and exhibiting an approximate 50/50 duty cycle. Element 124 is a S-R flip-flop which determines the interrupted and non-interrupted states of the transmitted clock and data. Element 133 is a parallel-in, serial-out shift register with a clock input CK and data inputs labelled DATA IN to which are connected $W=N+X$ data bits as a parallel word from the originating equipment. The signals at the DATA IN inputs are loaded into the element 133 according to the $\overline{LOAD}$ input and the clock input. Shift register 133 has an output terminal labelled OUT from which the data bits are output serially as the signal SDATA.

Elements 120 and 121 are counters such as type 74193 operated as down counters. The clock input signals to these counters are CLK1 and CLK2, respectively, and the active low borrow output signals are $\overline{OUT1}$ and $\overline{OUT2}$, respectively. Each of these output signals are connected to load inputs of the same counter, so that the counters act as modulo-M down counters by means of data inputs, labelled COUNT IN in FIG. 7. Counter 120 determines the integer number of clock cycles and hence the number of data bits in a transmitted word between the interruptions. This number is governed by count input $W=N+X$ from the originating equipment, shown connected to the COUNT IN inputs of 120. Counter 121 determines the integer number of clock cycles comprising the interruption interval, and is typically 1 clock cycle of the clock oscillator 110, as shown in FIG. 7. It is understood that other means than counters, such as shift registers, could be used for elements 120 and 121.

Flip-flop 124 determines the state of the transmitter; the interrupted state occurs when the Q output (signal TSYNC) is high. Flip-flop 124 toggles according to the $\overline{SET}$ and $\overline{CLR}$ inputs, to which are connected the counter outputs $\overline{OUT1}$ and $\overline{OUT2}$, respectively. The counters are clocked alternately by means of the oscillator signal OSCCLK applied to AND gates 122 and 123 which are cross-connected to the output signals TSYNC and $\overline{TSYNC}$ from flip-flop 124. Oscillator signal OSCCLK is applied continuously after inversion by invertor 134 to the clock input of shift register 133. Signal $\overline{TSYNC}$, from flip-flop 124 is applied to the $\overline{LOAD}$ input of register 133, so that a new parallel data word from the originating equipment is loaded into the shift register during the interval when the transmitted clocks are interrupted.

Figure 8:
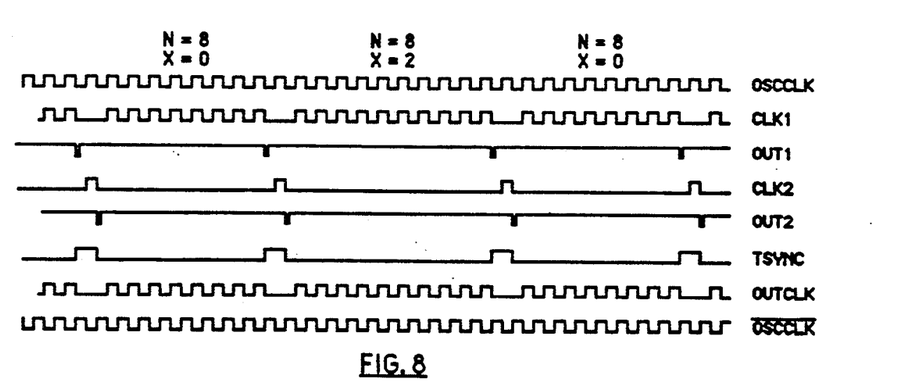
FIG. 8 is a series of graphs illustrating the operation of the apparatus of FIG. 7 for words of the particular standard length W=8 and for a word of non-standard length W=10.

The interrupted clock signal is conveniently provided by signal CLK1, the oscillator signal OCSCLK gated with $\overline{TSYNC}$ by AND gate 122, as may be seen by reference to FIG. 8. The transmitted clock signal OUTCLK and the transmitted data signal OUTDATA are obtained from CLK1 and SDATA, after passage through line driver circuits 132 and 131, respectively.

Figure 9:
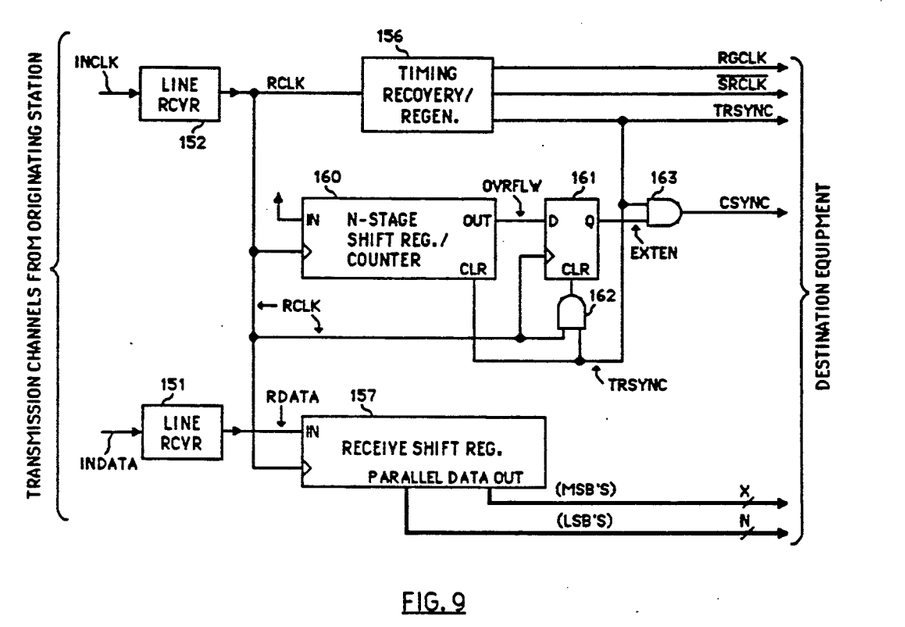
FIG. 9 is an electrical diagram illustrating in greater detail one embodiment of the altered length detector in the destination station of FIG. 5.

Attention is drawn now to FIG. 9, which shows one embodiment of the altered-length detector 155 of FIG. 5. The circuit of FIG. 9 is a special case of the altered-length detector when the lengths of the non-standard words are always longer than the standard words. Thus the embodiment of FIG. 9 is intended for extended words and X is always non-negative. The received clock signal RCLK and the received data signal RDATA are obtained from INCLK and INDATA, after passage through line receiver circuits 152 and 151, respectively, and represent the transmitted signals OUTCLK and OUTDATA at the destination station 150 of FIG. 5. Element 156 is the timing recovery/regenerator and element 157 is the receive shift register (or functional equivalent), discussed above with respect to FIG. 5. Elements 160, 161, 162, and 163 comprise a particular (extended length) form of the altered-length detector 155 of FIG. 5.

Figure 10:
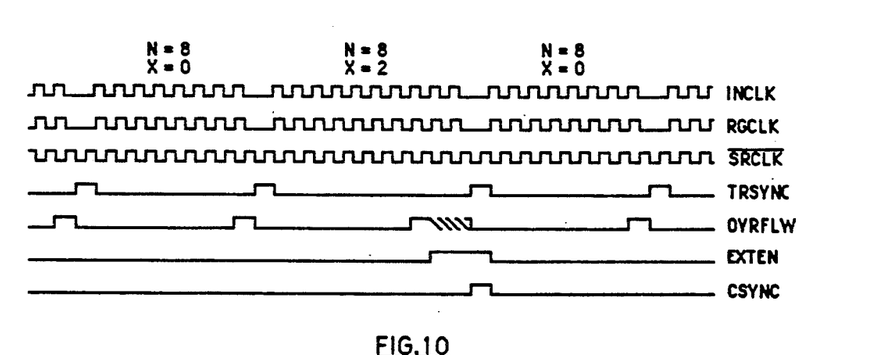
FIG. 10 is a series of graphs illustrating the operation of the apparatus of FIG. 9.

The operation of this extended length detector may be more readily understood by reference to FIG. 10, which is a timing diagram for the signals of FIG. 9. Element 160 is a circuit which is able to count at least N clock pulses, and it contains a clock input, a clear input (labelled CLR in FIG. 9), and an output with output signal OVRFLW. The received clock signal RCLK is connected to the clock input of element 160. The output signal TRSYNC from timing recovery/regenerator 156 is connected to the clear input of element 160. The output signal OVRFLW of 160 goes high in response to the Nth consecutive pulse in signal RCLK so long as TRSYNC remains low. For example, element 160 may consist of a simple up counter of capacity N; in this case OVRFLW becomes true when the counter is full. As an alternative, element 160 might consist of a shift register of N stages, in which case element 160 contains an additional serial input terminal, shown labelled as IN in FIG. 9 and connected to a logic high level; in this case OVRFLW corresponds to the output of the last stage of the shift register.

Element 161 is a flip-flop with D input connected to OVRFLW from element 160 and clock input connected to the received clock signal RCLK. Thus The output signal EXTEN from flip-flop 161 becomes true if more than N consecutive clocks are received before timing recovery/regenerator element 156 detects the interruption of the sequence of clocks in the received clock signal. When element 156 detects the interruption of the clock pulses, TRSYNC becomes high (true) which clears element 160, forcing signal OVRFLW low. The output of AND gate 162, with inputs connected to TRSYNC and RCLK, is connected to the clear input of flip-flop 161, and resets element 161. The extended length signal CSYNC is formed as the output of AND gate 163, with inputs TRSYNC and EXTEN. As may be seen from FIG. 10, the signal OVRFLW goes high when the Nth uninterrupted clock pulse is received, but signal EXTEN (and thus CSYNC) will go high only if another clock pulse is received prior to the missing pulse interval. In this way, signal CSYNC serves to inform the destination equipment that a word of extended length has been received.

Figure 11:
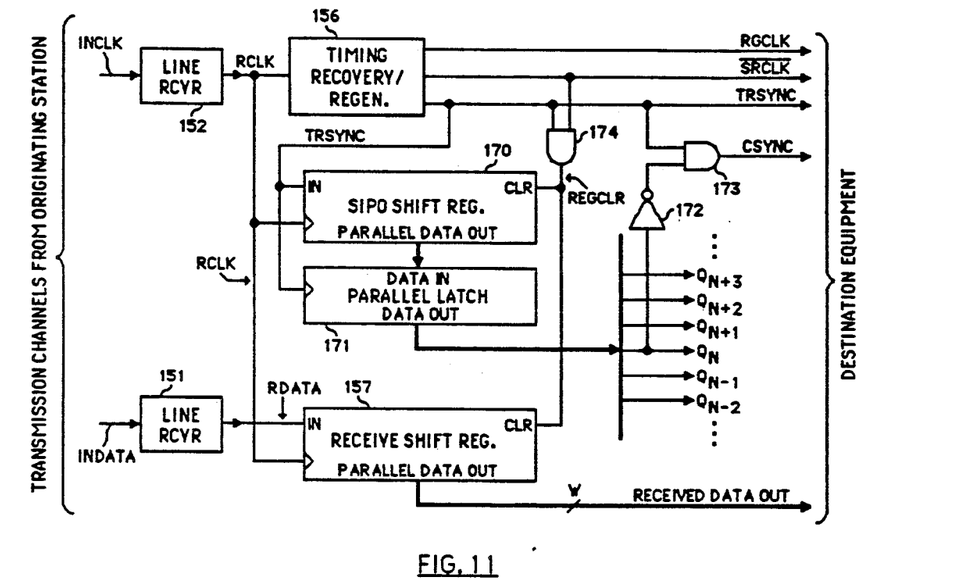
FIG. 11 is an electrical diagram illustrating in greater detail another embodiment of the altered length detector in the destination station of FIG. 5.
Figure 12:
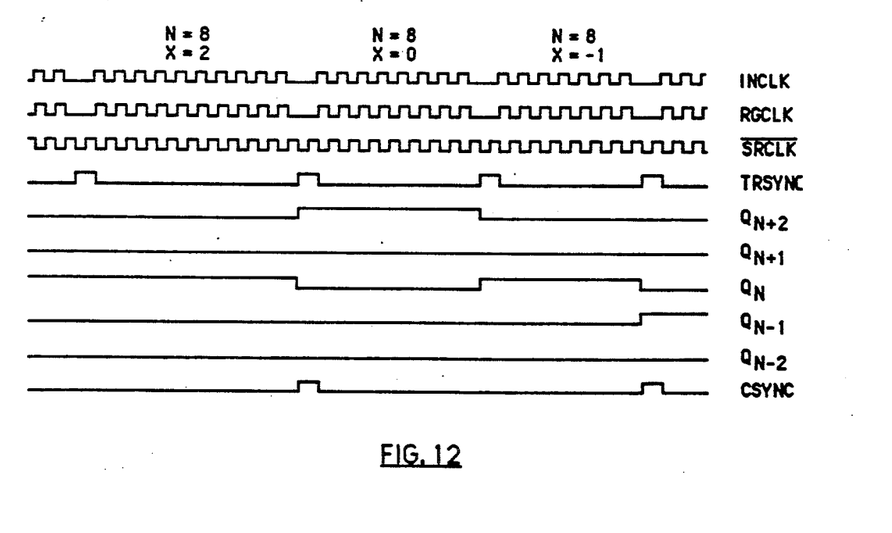
FIG. 12 is a series of graphs illustrating the operation of the apparatus of FIG. 11.

A second and more general embodiment of the altered-length detector 155 of FIG. 5 is shown in FIG. 11. The circuit of FIG. 11 may be more easily understood with reference to FIG. 12, which is a timing diagram for the signals of FIG. 11. The apparatus shown in FIG. 11 is capable not only of detecting whether a received word is altered in length, but also of identifying specific lengths. That is, the embodiment of FIG. 11 provides a way to determine the value of X. Elements 152, 151, 156 and 157 are the same as shown in FIG. 9, and are discussed above. In the embodiment of FIG. 11, however, the receive shift register 157 contains an additional optional input (labelled CLR), which when taken high clears the shift register element 157; this optional input is discussed below.

As shown in FIG. 11, data are shifted from right to left in receive shift register 157 and the data appear at the parallel data output terminals and are labelled RECEIVED DATA OUT. The RECEIVED DATA OUT signals number as many as W=N+X(max), where X(max) is the largest value of X and corresponds to the longest (altered-length) data message word.

Elements 170, 171, 172, 173 and 174 comprise the altered-length detector in the embodiment shown in FIG. 11. Element 170 is a serial-in parallel-out (SIPO) shift register. The serial input of register 170 is connected to TRSYNC and the clock input of 170 is connected to the received clock signal RCLK; register 170 also has a clear input connected to the signal REGCLR provided by AND gate 174. The input connections to 170 cause the high level provided by TRSYNC during the interrupted-clock interval to be successivly shifted along the stages of register. Thus the position of the high level within 170 at the start of the next interrupted-clock interval represents the length of the received data word contained in the signal RECEIVED DATA OUT from element 157.

SIPO shift register 170 has parallel output terminals labelled PARALLEL DATA OUT which are connected in parallel to the DATA IN input terminals of broadside d-type latch 171. This latch captures the length of the received word and presents it in the form of the several parallel outputs . . . $Q_{N-2}$ through $Q_{N+3}$ . . . for use by the destination equipment. Only one of these $Q_i$ outputs may be high at one time. The output of invertor 172, with input connected to $Q_N$, is high only for a non-standard word. This output and signal TRSYNC are connected as inputs to AND gate 173 the output of which is CSYNC, which goes high coincident with TRSYNC to indicate to the destination equipment the receipt of a non-standard word.

The signals TRSYNC and $\overline{SRCLK}$ are input to AND gate element 174, the output of which, REGCLR, is connected to the clear input of SIPO shift register element 170. In this way register 170 is cleared during the second half of the signal TRSYNC in order to prepare the shift register for the start of the next data message. The signal REGCLR may also be connected if desired to the clear input of receive shift register 157, depending on the requirements of the destination equipment, but this is not necessary in general. If REGCLR is used to clear element 157, the destination equipment must acquire the parallel bits of the received word at the leading edge of TRSYNC, since the receive shift register 157 is cleared at the midpoint of signal TRSYNC.

Figure 13:
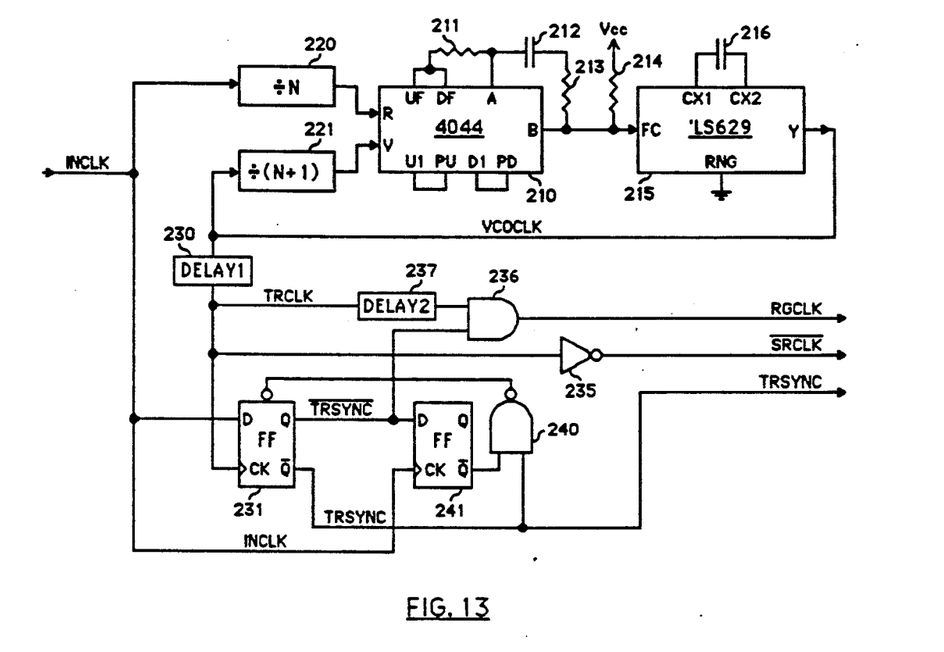
FIG. 13 is an electrical diagram illustrating an improved timing recovery/regenerator circuit for use with words of altered length.

An embodiment of the timing recovery/regenerator apparatus 156 of FIGS. 5, 9, and 11, for use with altered-length words and standard length words of N bits, is shown in FIG. 13. FIG. 13 may be better understood by reference to FIG. 14, which is a timing diagram for the signals of FIG. 13. Ref. (B) describes a similar apparatus intended for standard-length words only, and may be helpful in understanding the following discussion.

In FIG. 13 elements 210, 215, 220, and 221 are connected together as a phase-locked loop and serve to recover the frequency of the oscillator in the timing generator of the transmitting station. Element 210 is an integrated circuit (IC) containing a phase-frequency detector, a charge pump, and an amplifier, similar to Motorola type MC4044. This IC is connected in this example as a zero phase and frequency detector, with temporal characteristics set by resistors 211 and 213 and by capacitor 212; element 214 is a load resistor for the amplifier. The output of the amplifier is connected to the frequency control input of adjustable oscillator 215, of which the output frequency range is governed by timing capacitor 216 and various range input terminals. In this embodiment 215 is a voltage controlled oscillator (VCO) of type 74LS629, and provides an output frequency signal VCOCLK. The incoming timing message signal INCLK is connected to the input to the modulo N divider circuit 220; the output of 220 is connected to the reference input of the phase-frequency detector 210. The output of oscillator 215 is connected to the input to the modulo (N+1) divider circuit 221; the output of 221 is connected to the variable input of the phase-frequency detector 210. Proper timing recovery occurs when the VCO operates at that frequency when (N+1) cycles of VCOCLK take place during the time when N cycles of the interrupted clock INCLK take place. Nevertheless experiment shows that in practice the circuit of FIG. 13 can tolerate occasional received words with moderate departures from N cycles with the primary result that there is temporary drift or jitter in the VCO output signal VCOCLK.

Figure 14:
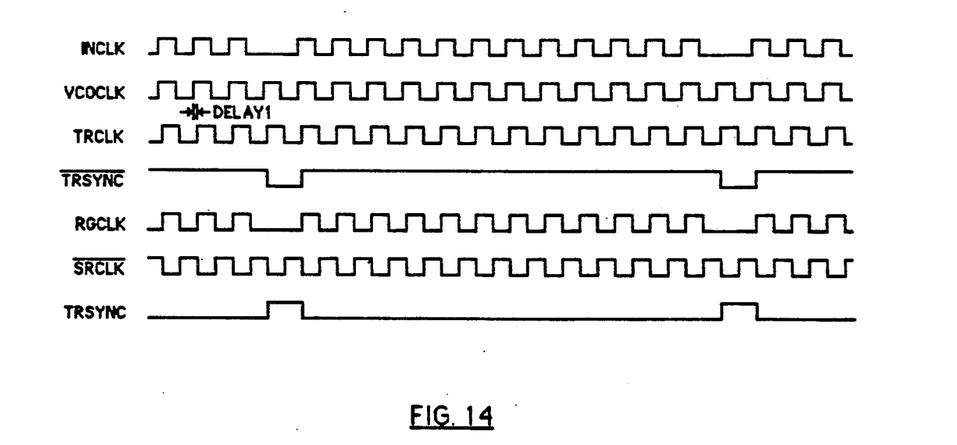
FIG. 14 is a series of graphs illustrating the operation of the apparatus of FIG. 13.

Continued examination of FIGS. 13 and 14 will show that elements 230 through 241 serve to regenerate the periodic timing signals associated with regenerator element 156. Elements 230 and 231 serve to detect the occurrence of the interrupted-clock interval. Element 230 is a delay line used to delay INCLK by a sufficient fraction of a clock cycle to allow for drift or jitter, from whatever cause, in the recovered clock signal VCOCLK. Initially set, so that $\overline{TRSYNC}$ is high, D flip-flop 231 will be reset by the first "missing clock" in INCLK. Thus the signal TRSYNC goes high in response to the occurrence of the interrupted-clock interval. D flip-flop 241, being clocked by INCLK and with D input $\overline{TRSYNC}$, detects the resumption of the previously interrupted clocks. Thus the active low output of flip-flop 241 goes high at the start of the clock-containing interval. Gate 240, connected to TRSYNC and to the active low output of flip-flop 241, provides a reset signal at the start of the clock-containing interval. This reset signal is used to set flip-flop 231 with the consequence that TRSYNC goes low when the timing clocks in INCLK resume. $\overline{TRSYNC}$ and TRCLK, after a further small time delay, DELAY2, provided by delay device 237 to allow for the propagation delay through flip-flop 231, are gated by element 236 to produce output signal RGCLK. The continuous clock $\overline{SRCLK}$ is obtained from TRCLK after inversion by invertor 235. The three signals, RGCLK, $\overline{SRCLK}$, and TRSYNC, each include the time delay, DELAY1, created by element 230, as may be seen from FIG. 14.

Examination of FIGS. 13 and 14 will reveal that flip-flop 231 serves to detect the start of the missing clock interval and that flip-flop 241 serves to detect the end of the missing clock interval. The use of separate flip-flops in conjunction with delay element 230 is an improvement over the prior art because it allows for a greater short-term error in the recovered clock signal VCOCLK, as is the case with altered-length words. The timing recovery/regenerator circuit shown in FIG. 13 has been demonstrated experimentally to operate correctly over a range in frequency of more than double, with continuous cycles of 15 standard length words followed by one altered-length word where the extended length word is characterized by ratios of X to N in the range 0.08 to 0.25.

Although this description has primarily been directed to particular preferred embodiments of the invention, it will be understood that many modifications and variations in construction, arrangement, and use are possible without departing from the true spirit of the present invention. The present invention is accordingly to be considered as including all modifications and variations coming within the scope of the appended claims.

What is claimed is:

1. A communication system for transmitting data from a sending station to a receiving station comprising:
   first channel means for carrying message timing information from said sending station to said receiving station;
   at least one second channel means for carrying message data information from said sending station to said receiving station;
   means for transmitting data signals from said sending station to said receiving station over said second channel means at a preselected frequency, the data signals representing data words; and
   means for transmitting a number of consecutive timing signals from said sending station to said receiving station over said first channel means at said preselected frequency followed by an interruption in said timing signals after each group of data signals to indicate the end of each corresponding data word;
   the means for transmitting timing signals including means for altering said number of consecutive timing signals from a first predetermined value to at least one second value in order to distinguish respectively between a first category of data message information and at least one second category of of data message information.

2. The communication system of claim 1 wherein:
   said timing signals are timing pulses; and
   said data signals are binary data pulses.

3. The communication system of claim 1 which further comprises:
   means for receiving said timing signals at the receiving station;
   means for receiving said data signals at the receiving station;
   the means for receiving timing signals including means for detecting the interruption of said timing signals; and
   the means for receiving data signals including means for separating the received data signals into data words in response to the means for detecting the interruption of the timing signals.

4. The communication system of claim 3 wherein:
   the means for receiving timing signals further comprises means responsive to the condition that the number of consecutive timing pulses between interruptions is equal to said first predetermined value in order to identify data words of said first category of data message information.

5. The communication system of claim 4 wherein:
   the means for altering the number of consecutive timing signals further comprises means for selecting among a plurality of said second values in order to distinguish among a plurality of members of said second category of data message information.

6. The communication system of claim 5 wherein:
   the means for receiving timing signals further comprises means responsive individually to said plurality of second values of consecutive timing signals in order to distinguish individually among said plurality of members of said second category of data message information.

7. The communication system of claim 3 wherein:
   the means for transmitting timing signals includes means for varying the frequency of the timing signals in accordance with at least one characteristic of the first and second channel means.

8. The communication system of claim 7 wherein:
   the means for receiving timing signals further comprises means for detecting the frequency of received timing signals; and
   the means for receiving data signals includes means for sensing data signals at the detected frequency of said timing signals.

9. In a system using a transmission channel means for carrying sequential timing messages from a transmitting station to a receiving station, wherein said timing messages each consist of an interval containing clocks, said interval containing clocks being of duration equal to $W_i$ cycles of an oscillator associated with the transmitting station, and an interval without clocks, said interval without clocks being of duration equal to m cycles of said oscillator associated with the transmitting station, where $W_i$ is any one of a set of positive integers and m is a positive integer, a receiving station apparatus which comprises:
   apparatus for detecting the commencement of said interval without clocks;
   apparatus for detecting the commencement of said interval containing clocks; and
   altered-length detection apparatus which includes means for producing an output signal in response to the occurance of said interval containing clocks for which said integer $W_i$ is not equal to a positive integer N, whereby an external device may be informed that the clock-containing interval did not contain exactly N clocks.

10. The altered-length detection apparatus of claim 9 which further includes:
    means for producing output signals responsive to the occurrance of said interval containing clocks and indicative of the corresponding integer $W_i$, whereby an external device may be informed of the number of clocks in said interval containing clocks.

11. In a system using a transmission channel means for carrying sequential timing messages from a transmitting station to a receiving station, wherein said timing messages each consist of an interval containing clocks, said interval containing clocks being of duration equal to $W_i$ cycles of an oscillator associated with the transmitting station, where $W_i$ is any one of a set of positive integers, and where the average of the values of said integers $W_i$ over the preceding T messages approaches the value of a positive integer N as T is increased, T being a variable positive integer, and an interval without clocks, said interval without clocks being of duration equal to m cycles of said oscillator associated with the transmitting station, m being a positive integer, a timing recovery apparatus connected to said transmission channel means and comprising:
    a phase-frequency detector circuit;
    a variable oscillator with at least one frequency control input;
    a modulo N divider circuit, with input connected to said transmission channel means and with output connected to one input of said phase-frequency detector circuit, N being said positive integer; and
    a modulo (N+m) divider circuit, with input connected to the output of said variable oscillator and with output connected to another input of said phase-frequency detector circuit, N and m being said positive integers;

the output of said phase-frequency detector circuit being connected to the frequency control input of said variable oscillator so as to cause said variable oscillator to operate at a frequency such that the difference between the frequency of said variable oscillator and the frequency of said oscillator associated with the transmitting station approaches zero as said average of the values of said integers $W_i$ approaches said value of said integer N.

12. The timing recovery apparatus of claim 11 which further comprises:

means for providing an output signal with a frequency equal to that of said variable oscillator whereby an external device may be signalled at the frequency of said variable oscillator.

13. The timing recovery apparatus of claim 11 which further comprises:

means for detecting the commencement of said interval without clocks.

14. The timing recovery apparatus of claim 13 wherein:

said means for detecting the commencement of said interval without clocks includes means for providing an output signal which changes state in response to the beginning of said interval without clocks, whereby an external device may be signalled that the interval without clocks has commenced.

15. The timing recovery apparatus of claim 13 which further comprises:

means for detecting the commencement of said interval containing clocks.

16. The timing recovery apparatus of claim 15 wherein:

said means for detecting the commencement of said interval containing clocks includes means for providing an output signal which changes state in response to the beginning of said interval containing clocks, whereby an external device may be signalled that the interval containing clocks has commenced.

17. The timing recovery apparatus of claim 15 which further comprises:

means for providing an output signal which changes from a first state to a second state in response to the beginning of said interval without clocks and from said second state to said first state in response to the beginning of said interval containing clocks, whereby an external device may be signalled in response to the beginnings of said interval without clocks and of said interval containing clocks.

* * * * *

UNITED STATES PATENT AND TRADEMARK OFFICE
CERTIFICATE OF CORRECTION

PATENT NO. : 5,138,634

DATED : August 11, 1992

INVENTOR(S) : Stephen L. Knapp

It is certified that error appears in the above-identified patent and that said Letters Patent is hereby corrected as shown below:

Sheet 2 of 6 of the drawing, consisting of Fig. 6, should be deleted to be replaced with the sheet of drawing, consisting of Fig. 6 as shown on the attached page.

Signed and Sealed this

Sixteenth Day of November, 1993

Attest:

BRUCE LEHMAN

*Attesting Officer*     *Commissioner of Patents and Trademarks*

FIG.6

FIG.5